United States Patent
Wang et al.

(10) Patent No.: US 12,337,626 B2
(45) Date of Patent: Jun. 24, 2025

(54) BURST-RESISTANT TIRE EMBEDDED WITH A PLURALITY OF OPEN TUBULAR MEMBERS

(71) Applicant: SHENZHEN KINGTITAN TECHNOLOGY CO., LTD, Guangdong (CN)

(72) Inventors: Bing Wang, Guangdong (CN); Qiansun Yu, Guangdong (CN)

(73) Assignee: SHENZHEN KINGTITAN TECHNOLOGY CO., LTD, Shenzhen (CN)

(*) Notice: Subject to any disclaimer, the term of this patent is extended or adjusted under 35 U.S.C. 154(b) by 669 days.

(21) Appl. No.: 17/230,970

(22) Filed: Apr. 14, 2021

(65) Prior Publication Data
US 2021/0229498 A1 Jul. 29, 2021

Related U.S. Application Data

(63) Continuation-in-part of application No. 15/855,501, filed on Dec. 27, 2017, now abandoned, and a
(Continued)

(30) Foreign Application Priority Data

Jul. 3, 2015 (CN) .......................... 201510391967.1

(51) Int. Cl.
*B60C 7/10* (2006.01)
*B60B 9/12* (2006.01)
*B60B 9/26* (2006.01)

(52) U.S. Cl.
CPC .................. *B60C 7/10* (2013.01); *B60B 9/12* (2013.01); *B60B 9/26* (2013.01); *B60C 7/107* (2021.08)

(58) Field of Classification Search
CPC .... B60B 5/02; B60B 9/02; B60B 9/04; B60B 9/10; B60B 9/12; B60B 9/26; B60C 7/10; B60C 7/102; B60C 7/107
See application file for complete search history.

(56) References Cited

U.S. PATENT DOCUMENTS 1,445,768 A * 2/1923 Hulse ....................... B60C 7/107
152/324
1,616,843 A * 2/1927 Brubaker ................ B60C 7/107
152/324
(Continued)

FOREIGN PATENT DOCUMENTS

CN 1040956 A 4/1990
CN 1061187 A 5/1992
(Continued)

*Primary Examiner* — Jason R Bellinger

(57) ABSTRACT

A burst-resistant tire embedded with open tubular members include an outer ring, an inner ring and the open tubular members. The outer ring is composed of a first outer ring and a second outer ring, which are symmetrical with respect to a central radial plane of the burst-resistant tire. The open tubular members include multiple first open tubular members and multiple second open tubular members. The first open tubular members are provided between the first outer ring and the inner ring, and the second open tubular members are provided between the second outer ring and the inner ring. The second open tubular members and the first open tubular members are connected at the central radial plane of the burst-resistant tire.

5 Claims, 3 Drawing Sheets

Related U.S. Application Data continuation-in-part of application No. PCT/CN2016/087176, filed on Jun. 25, 2016.

(56) References Cited

U.S. PATENT DOCUMENTS

| | | | | |
|---|---|---|---|---|
| 4,235,270 | A | * | 11/1980 | Kahaner .................. B60B 9/12 |
| | | | | 152/326 |
| 5,343,916 | A | * | 9/1994 | Duddey .................. B60C 7/107 |
| | | | | 152/5 |
| 6,681,822 | B2 | * | 1/2004 | Adams ..................... B60C 7/00 |
| | | | | 152/326 |
| 8,104,524 | B2 | | 1/2012 | Manesh et al. |
| 8,276,628 | B2 | * | 10/2012 | Hanada ................ B60C 17/061 |
| | | | | 152/157 |
| 8,851,131 | B2 | * | 10/2014 | Luchini .................. B60C 7/107 |
| | | | | 152/324 |
| 10,166,732 | B2 | * | 1/2019 | Thompson ................ B60C 7/18 |
| 10,286,725 | B2 | * | 5/2019 | Celik ....................... B60B 9/26 |
| 10,749,242 | B2 | * | 8/2020 | Fenkanyn ............ H01Q 1/2241 |
| 2007/0119531 | A1 | * | 5/2007 | Steinke .................. B60C 17/06 |
| | | | | 152/324 |
| 2015/0343840 | A1 | | 12/2015 | Kinney et al. |
| 2020/0331221 | A1 | * | 10/2020 | Thompson .............. B60C 7/143 |

FOREIGN PATENT DOCUMENTS

| | | |
|---|---|---|
| CN | 101134420 A | 3/2008 |
| CN | 101314315 A | 12/2008 |
| CN | 101519022 A | 9/2009 |
| CN | 104972838 A | 10/2015 |
| CN | 204915127 U | 12/2015 |
| DE | 19548902 A1 | 1/1997 |
| JP | 3952211 B1 | 8/2007 |

* cited by examiner

BURST-RESISTANT TIRE EMBEDDED WITH
A PLURALITY OF OPEN TUBULAR
MEMBERS

CROSS-REFERENCE TO RELATED
APPLICATIONS

This application is a continuation-in-part application of U.S. application Ser. No. 15/855,501, filed on Dec. 27, 2017, now abandoned, which is a continuation of International Patent Application No. PCT/CN2016/087176, filed on Jun. 25, 2016, claiming the benefit of priority from Chinese Patent Application No. 201510391967.1, filed on Jul. 3, 2015. The content of the aforementioned applications, including any intervening amendments thereto, is incorporated herein by reference in their entirety.

TECHNICAL FIELD

This application relates to non-pneumatic tires, and more particularly to a burst-resistant tire embedded with a plurality of open tubular members.

BACKGROUND

Tire is usually made of a wear-resistant rubber material, and is divided into a solid tire and a pneumatic tire. The pneumatic tire is composed of an inner tire and an outer tire, and the defect of the pneumatic tire is that the rubber material of the tire tread is prone to wearing. Moreover, the inner tire is likely to suffer from a burst because of the inflatable support. However, the existing solid tire also has many defects, for example, it is difficult to determine which material to make solid tires. Recently, it has been found that polyurethane materials are preferable in the manufacture of tires due to the wear resistance and adjustable hardness.

Chinese Patent Application No. 200710108803.9 discloses a non-pneumatic vehicle tire, which is provided with a tread supporting ring formed by a series of transversely-extending circular tubular channel and an inner ring formed by the engagement of a series of transversely-extending rims. This structure not only reduces the cost and the weight, but also improves the comfortability. However, this structure also has the defect that since the tread supporting rings run through the whole tire disk, when the diameter of the supporting ring is large, the span of the supporting rings is increased, and the supporting force applied to the tread between two adjacent supporting rings is weakened, resulting in uneven stress on the whole tread.

SUMMARY

An object of this application is to provide a burst-resistant tire embedded with a plurality of open tubular members to overcome the defects in the prior art, where the tread of the tire provided herein is under even stress.

Technical solutions of this application are described as follows.

This application provides a burst-resistant tire embedded with a plurality of open tubular members, comprising:
an outer ring;
an inner ring; and
the plurality of open tubular members;
wherein the outer ring consists of a first outer ring and a second outer ring; the first outer ring and the second outer ring are symmetrical with respect to a central radial plane of the burst-resistant tire; the plurality of open tubular members comprise a plurality of first open tubular members and a plurality of second open tubular members; the plurality of first open tubular members are provided between the first outer ring and the inner ring; the plurality of second open tubular members are provided between the second outer ring and the inner ring; and the plurality of second open tubular members and the plurality of first open tubular members are connected at the central radial plane of the burst-resistant tire;
two adjacent first open tubular members are connected to form a closed loop; two adjacent second open tubular members are connected to form a closed loop; each of the plurality of first open tubular members abuts against the first outer ring and the inner ring; each of the plurality of second open tubular members abuts against the second outer ring and the inner ring; a first cavity is formed between adjacent first open tubular members and the first outer ring; a second cavity is formed between adjacent first open tubular members and the inner ring; a third cavity is formed between adjacent second open tubular members and the second outer ring; and a fourth cavity is formed between adjacent second open tubular members and the inner ring.

In an embodiment, the plurality of first open tubular members are evenly distributed around an axis of the inner ring; and the plurality of second open tubular members are evenly distributed around the axis of the inner ring.

In an embodiment, an axis of each of the plurality of first open tubular members is parallel to the axis of the inner ring; an axis of each of the plurality of second open tubular members is parallel to the axis of the inner ring; a section of each of the plurality of first open tubular members along the central radial plane of the burst-resistant tire is circular; and a section of each of the plurality of second open tubular members along the central radial plane of the burst-resistant tire is circular.

In an embodiment, the plurality of first open tubular members and the plurality of second open tubular members are arranged asymmetrically.

In an embodiment, a connection point of two adjacent first open tubular members is located at an axis of the corresponding second open tubular member.

In an embodiment, the plurality of first open tubular members and the plurality of second open tubular members are arranged symmetrically; the first cavity communicates with the third cavity; and the second cavity communicates with the fourth cavity.

In an embodiment, the plurality of first open tubular members are the same with the plurality of second open tubular members in shape and size.

In an embodiment, an axial width of the outer ring is equal to an axial width of the inner ring.

In an embodiment, the axial width of the outer ring is larger than that of the inner ring; and a cross section of the burst-resistant tire is trapezoid-shaped.

Compared to the prior art, this application has the following beneficial effects.

In the burst-resistant tire provided herein, multiple first and second open tubular members are arranged, and the first and second open tubular members all abut against the inner ring and the outer ring. Based on this arrangement, when the outer ring is in contact with the ground, the stress can be buffered to both sides of a point where the outer ring is in contact with the first open tubular structure or the second open tubular structure, which facilitates the rapid dispersion of the stress, avoiding concentrated force on the same point and avoiding the overloading of the tire.

Figure 1:
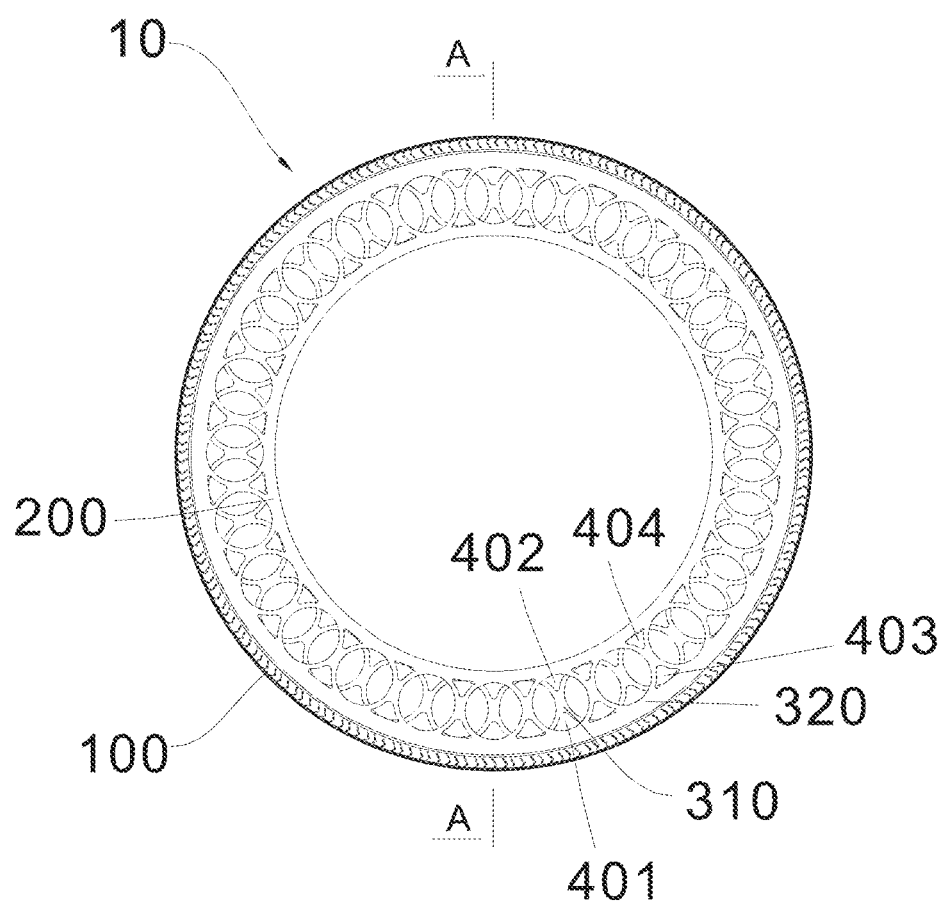
FIG. 1 is a front view of a burst-resistant tire embedded with multiple open tubular members according to an embodiment of the disclosure.

In the drawings, 10—burst-resistant tire; 100—outer ring; 110—first outer ring; 120—second outer ring; 200—inner ring; 310—first open tubular member; 320—second open tubular member; 401—first cavity; 402—second cavity; 403—third cavity; and 404—fourth cavity.

DETAILED DESCRIPTION OF EMBODIMENTS

The technical solutions of the disclosure will be clearly and completely described below with reference to the accompanying drawings and embodiments. Obviously, presented in the drawings are merely some embodiments of the disclosure, and are not intended to limit the disclosure. It should be understood that other embodiments obtained by those skilled in the art based on the content disclosed herein without sparing any creative effort should fall within the scope of the disclosure.

Figure 3:
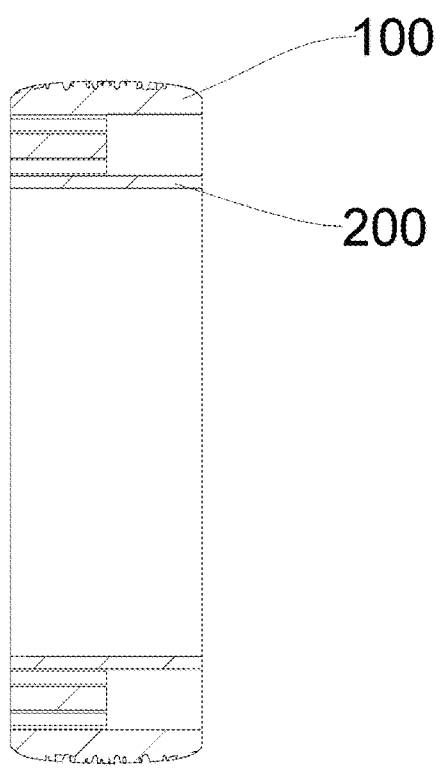
FIG. 3 is a sectional view of the burst-resistant tire in FIG. 1 along line A-A according to another embodiment of the disclosure.
Figure 4:
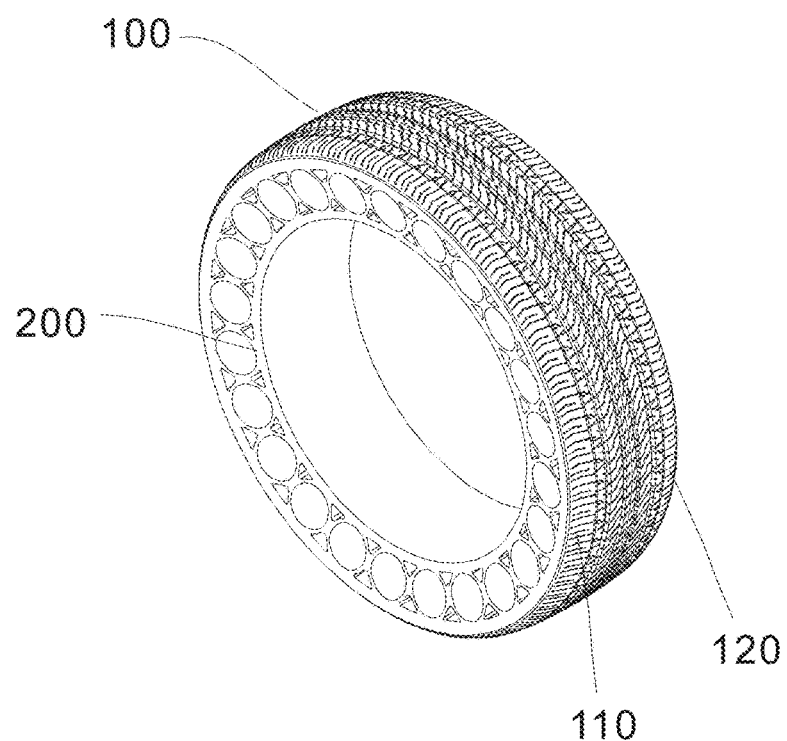
FIG. 4 is a perspective view of the burst-resistant tire according to an embodiment of the disclosure.

As shown in FIGS. 1 and 3-4, a burst-resistant tire 10 embedded with a plurality of open tubular members is provided, including an outer ring 100, an inner ring 200 and the plurality of open tubular members. The outer ring 100 consists of a first outer ring 110 and a second outer ring 120. The first outer ring 110 and the second outer ring 120 are symmetrical with respect to a central radial plane of the burst-resistant tire 10. The plurality of open tubular members include a plurality of first open tubular members 310 and a plurality of second open tubular members 320. The plurality of first open tubular members 310 are provided between the first outer ring 110 and the inner ring 200. The plurality of second open tubular members 320 are provided between the second outer ring 120 and the inner ring 200. The plurality of second open tubular members 320 and the plurality of first open tubular members 310 are connected at the central radial plane of the burst-resistant tire 10.

Two adjacent first open tubular members 310 are connected to form a closed loop, and two adjacent second open tubular members 320 are connected to form a closed loop. Each of the plurality of first open tubular members 310 abuts against the first outer ring 110 and the inner ring 200. Each of the plurality of second open tubular members 320 abuts against the second outer ring 120 and the inner ring 200. A first cavity 401 is formed between adjacent first open tubular members 310 and the first outer ring 110. A second cavity 402 is formed between adjacent first open tubular members 310 and the inner ring 200. A third cavity 403 is formed between adjacent second open tubular members 320 and the second outer ring 120. A fourth cavity 404 is formed between adjacent second open tubular members 320 and the inner ring 200.

The plurality of first open tubular members 310 are evenly distributed around an axis of the inner ring 200, and the plurality of second open tubular members 320 are evenly distributed around the axis of the inner ring 200.

An axis of each of the plurality of first open tubular members 310 is parallel to the axis of the inner ring 200, and an axis of each of the plurality of second open tubular members 320 is parallel to the axis of the inner ring 200. A section of each first open tubular member 310 along the central radial plane of the burst-resistant tire 10 is circular, and a section of each second open tubular member 320 along the central radial plane of the burst-resistant tire 10 is circular.

In an embodiment, the plurality of first open tubular members 310 and the plurality of second open tubular members 320 are arranged asymmetrically.

In an embodiment, a connection point of two adjacent first open tubular members 310 is located at an axis of the corresponding second open tubular member 320. In this case, an optimal buffering performance can be obtained when the outer ring 100 is on the ground. The uniform distribution of the first open tubular members 310 and the second open tubular members 320 enables the first open tubular members 310 and the second open tubular members 320 to provide even support for the outer ring 100, ensuring that the outer ring 100 is under uniform stress, and improving the comfortability of the burst-resistant tire 10.

In an embodiment, the plurality of first open tubular members 310 and the plurality of second open tubular members 320 are arranged symmetrically. In this case, the first cavity 401 communicates with the third cavity 403, and the second cavity 402 communicates with the fourth cavity 404.

In an embodiment, the plurality of first open tubular members 310 are the same with the plurality of second open tubular members 320 in shape and size.

In an embodiment, an axial width of the outer ring 100 is equal to an axial width of the inner ring 200. In an embodiment, the axial width of the outer ring 100 is equal to the sum of the length of one first open tubular member 310 and the length of one second open tubular member 320.

Figure 2:
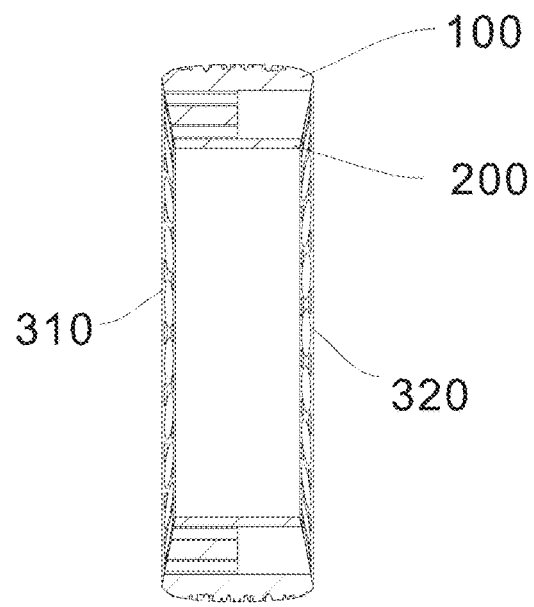
FIG. 2 is a sectional view of the burst-resistant tire in FIG. 1 along line A-A according to an embodiment of the disclosure.
Figure 5:
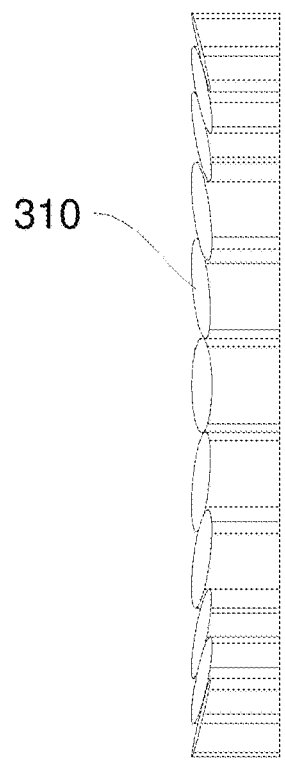
FIG. 5 schematically shows a structure of the first open tubular members according to an embodiment of the disclosure.

In an embodiment shown in FIGS. 2 and 5, the axial width of the outer ring 100 is larger than that of the inner ring 200, and a cross section of the burst-resistant tire 10 is trapezoid-shaped. In this case, a length of a side of the first open tubular member 310 abutting on the first outer ring 110 is equal to the axial width of the first outer ring 110, a length of a side of the first open tubular member 310 abutting on the inner ring 200 is equal to the axial width of the inner ring 200, and the end of the first open tubular member 310 facing outward is inclined from the first outer ring 110 to the inner ring 200. The second open tubular member 320 is designed in the same manner.

Described above are merely preferred embodiments of the disclosure, which are not intended to limit the disclosure. Any modification, change and replacement made by those skilled in the art without departing from the spirit of the disclosure should fall within the scope of the disclosure.

What is claimed is:

1. A burst-resistant tire embedded with a plurality of open tubular members, comprising:
   an outer ring;
   an inner ring; and
   the plurality of open tubular members;

wherein the outer ring comprises a first axial side and a second axial side; the first axial side and the second axial side are symmetrical with respect to a central radial plane of the burst-resistant tire; the plurality of open tubular members comprise a plurality of first open tubular members and a plurality of second open tubular members; the plurality of first open tubular members are provided between the first axial side and the inner ring; the plurality of second open tubular members are provided between the second axial side and the inner ring; and the plurality of second open tubular members and the plurality of first open tubular members are connected at the central radial plane of the burst-resistant tire;

two adjacent first open tubular members are connected to form a closed loop; two adjacent second open tubular members are connected to form a closed loop; each of the plurality of first open tubular members abuts against the first axial side and the inner ring; each of the plurality of second open tubular members abuts against the second axial side and the inner ring; a first cavity is formed between adjacent first open tubular members and the first axial side; a second cavity is formed between adjacent first open tubular members and the inner ring; a third cavity is formed between adjacent second open tubular members and the second axial side; and a fourth cavity is formed between adjacent second open tubular members and the inner ring;

the plurality of first open tubular members are evenly distributed around an axis of the inner ring; and the plurality of second open tubular members are evenly distributed around the axis of the inner ring;

an axis of each of the plurality of first open tubular members is parallel to the axis of the inner ring; an axis of each of the plurality of second open tubular members is parallel to the axis of the inner ring; a section of each of the plurality of first open tubular members along the central radial plane of the burst-resistant tire is circular; and a section of each of the plurality of second open tubular members along the central radial plane of the burst-resistant tire is circular; and the plurality of first open tubular members and the plurality of second open tubular members are arranged symmetrically; the first cavity communicates with the third cavity; and the second cavity communicates with the fourth cavity.

2. The burst-resistant tire of claim 1, wherein the plurality of first open tubular members and the plurality of second open tubular members are arranged asymmetrically.

3. The burst-resistant tire of claim 2, wherein a connection point of two adjacent first open tubular members is located at an axis of the corresponding second open tubular member.

4. The burst-resistant tire of claim 2, wherein an axial width of the outer ring is equal to an axial width of the inner ring.

5. The burst-resistant tire of claim 2, wherein an axial width of the outer ring is larger than that of the inner ring; and a cross section of the burst-resistant tire is trapezoid-shaped.

* * * * *